June 24, 1930.  J. W. COATES  1,766,104
TRUCK
Filed May 18, 1927 4 Sheets-Sheet 1
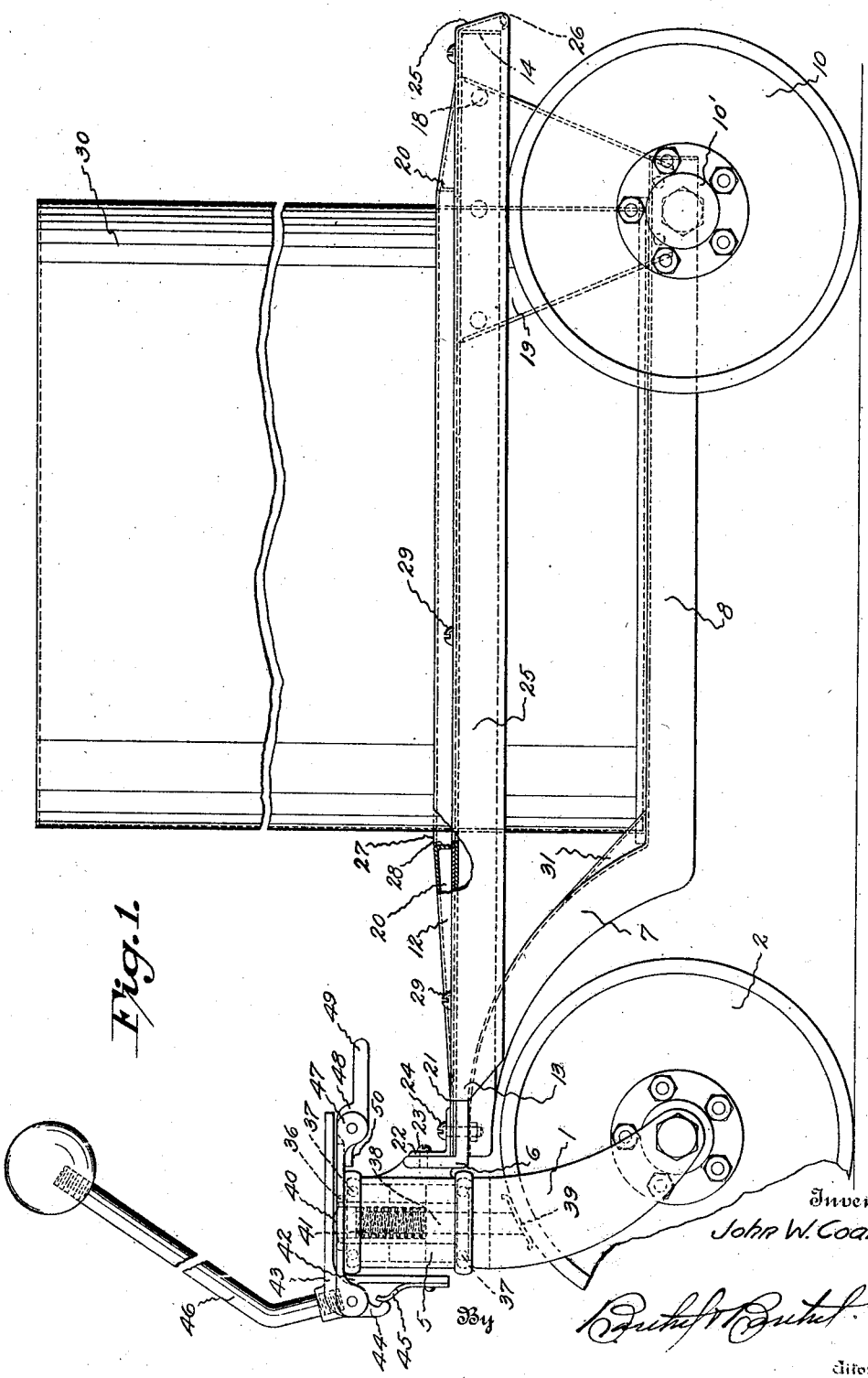
Inventor
John W. Coates.

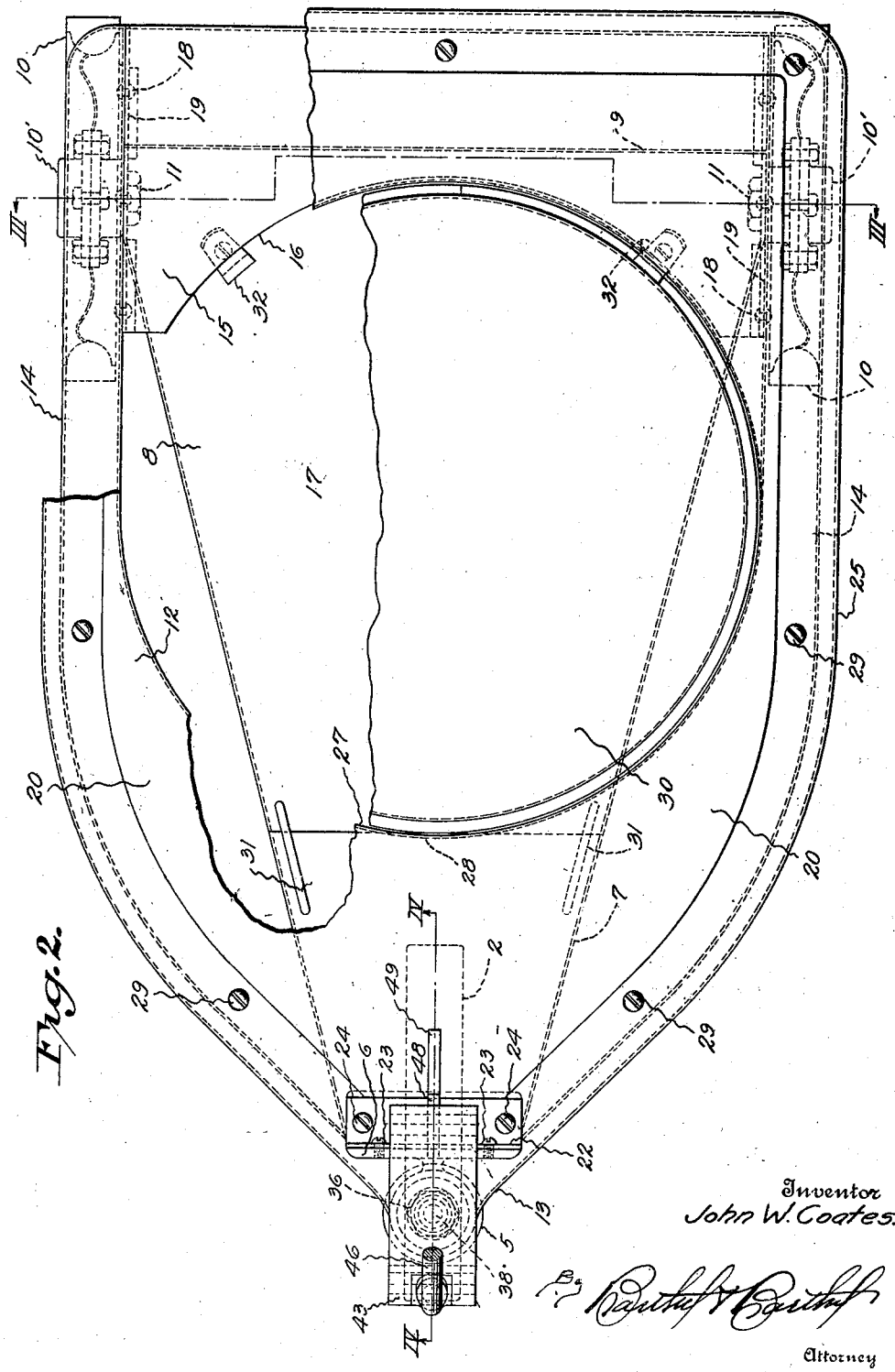

June 24, 1930.                J. W. COATES                1,766,104
                                 TRUCK
                           Filed May 18, 1927          4 Sheets-Sheet 3
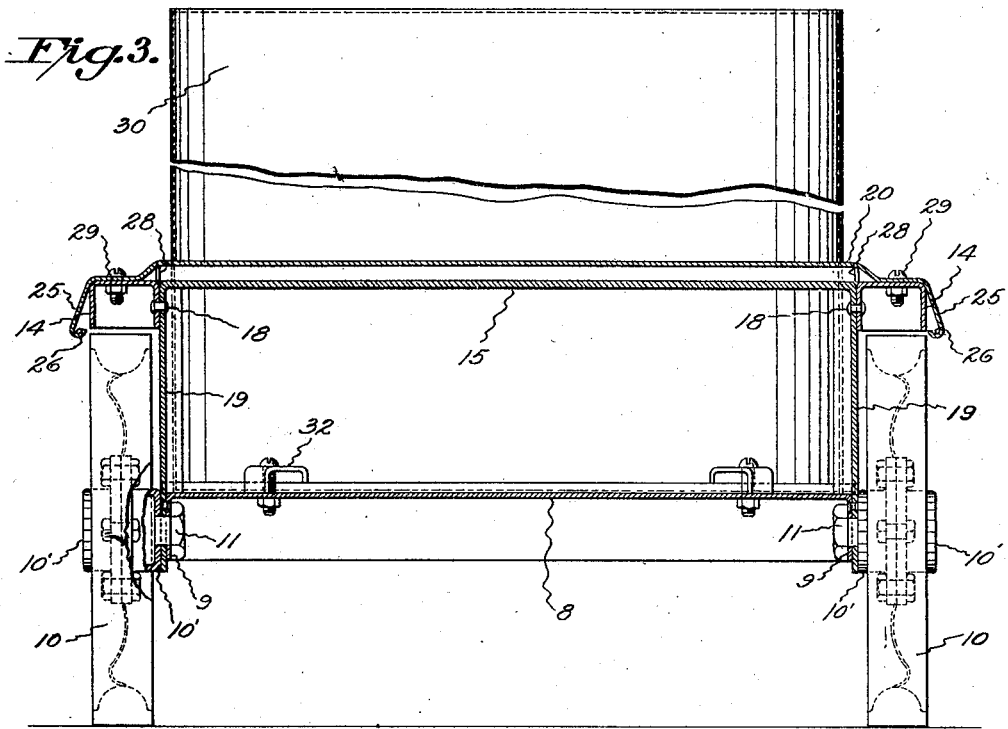
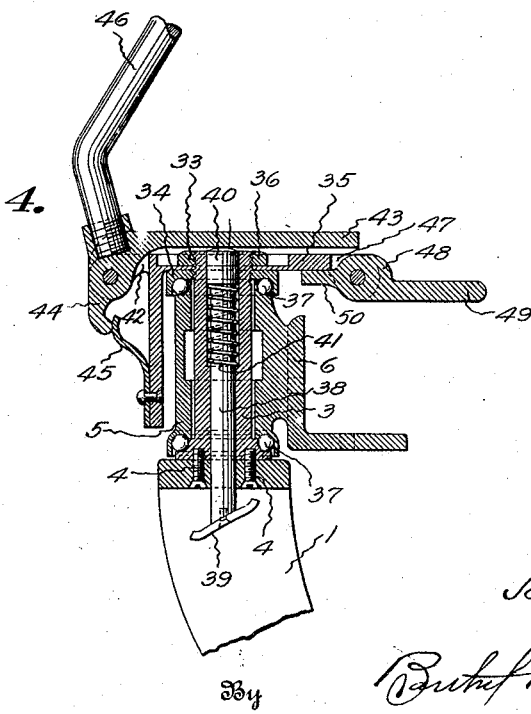
Inventor
John W. Coates.
By
Attorney June 24, 1930.  J. W. COATES  1,766,104
TRUCK
Filed May 18, 1927  4 Sheets-Sheet 4

Inventor
John W. Coates

By
Attorney

Patented June 24, 1930

1,766,104

UNITED STATES PATENT OFFICE

JOHN W. COATES, OF DETROIT, MICHIGAN

TRUCK

Application filed May 18, 1927. Serial No. 192,204.

The present invention pertains to trucks designed for carrying tanks and the like, in local transportation in factories, plants, etc, and is in its general nature similar to the device described in my co-pending application Serial No. 60,470, filed October 5, 1925.

These trucks carry a rather heavy load and therefore acquire considerable momentum to be overcome in bringing them to a stop. This momentum is also a source of danger when the truck is being taken down an incline or when it must be quickly stopped in an emergency.

The principal object of this invention is an automatic braking device which will function in such contingencies and also when the operator merely stops pulling the draft handle. The front or steering wheel of the truck may be swung by the draft handle and is further provided with a braking mechanism which comes into play at any time that there is relative movement between the truck body as a whole and the draft handle, as when the body tends to advance upon the handle in any of the cases mentioned above. Moreover, the brake mechanism is constructed to take a locking or clamping position except when the draft handle is pulled. Thus, the truck is not free to ride except when a pull is exerted on the handle. A device is provided for rendering the brake inoperative, so that the truck may be drawn and controlled in the ordinary manner if desired.

The invention provides further for an improved construction in the body of the truck whereby a finished appearance is imparted and a device is arranged for shedding liquid that may be spilled from a receptacle on the truck.

The invention is fully disclosed in the following description and in the accompanying drawings, in which—

Figure 1 is a side elevation of the device;

Fig. 2 is a plan view thereof, partly broken away;

Fig. 3 is a section on the line 3—3 of Figure 2;

Fig. 4 is a detail vertical section of the steering and braking mechanism, on the line 4—4 of Fig. 2.

Reference to these views will now be made by use of like characters which are employed to designate corresponding parts throughout.

Figure 5:
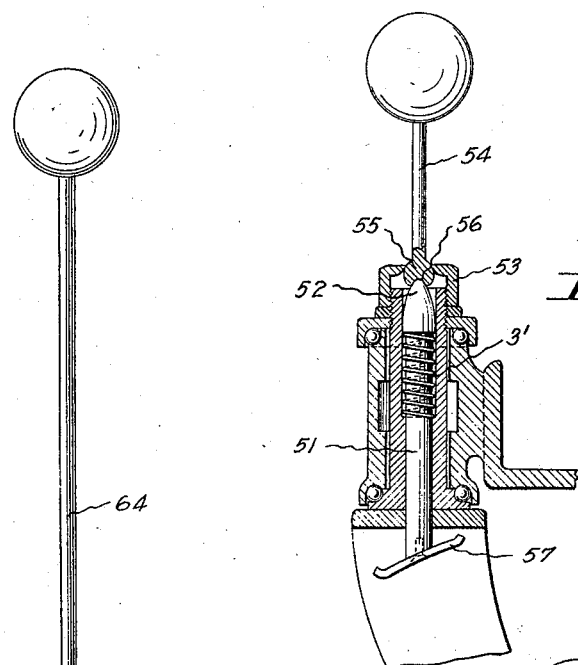
Figs. 5, 6 and 7 are vertical sections of modified constructions.

At the front end of the vehicle is a single castor leg 1 carrying a steering wheel 2 and formed at its upper end with a tubular extension 3 fixed thereto by screws 4. The extension is journaled in a sleeve 5, the details of which will presently be pointed out, and at the rear side of the sleeve is an integral angle bracket 6 lying transversely of the vehicle. To the lower surface of this bracket is secured the forward curved neck 7 of an underslung chassis 8. The chassis widens from the comparatively narrow bracket 6 rearwardly to the wheels as shown more clearly in Figure 2. The chassis has a marginal flange 9 to which the rear wheels 10 are journaled by means of suitable studs 11 as shown in Figure 3.

The body of the vehicle also includes a platform having a substantially U-shaped forward element 12 formed with a point 13 at the saddle thereof, and this point is laid upon the horizontal part of the bracket 6 as shown in Figure 1. Both edges of the U-shaped member are turned downwardly to form flanges 14, and the flanges at the legs of the U-shaped member appear in Figure 3. At the rear ends of the legs is provided an insert 15, the inner edge 16, of which is cut in such a manner as to form a circular opening 17 in conjunction with the exposed inner edge of the U-shaped member. The insert is secured to the inner flanges 14 of the legs of the member 12 by means of rivets 18 or other suitable securing means. Brackets 19 hang from the lateral edges of the insert and are received between the corresponding flange 9 of the chassis and the adjacent wheel hub 10'.

Over the sub-platform thus formed is laid a floor 20 substantially coincident with the sub-platform. This floor also has a forward point 21 laid over the point 13 at the bracket 6. An angle iron 22 is laid on the point 21 and has its vertical legs secured to the vertical leg of the bracket 6 by screws 23. The horizontal legs of the two angle pieces, the forward extremity of the chassis, and the points 13 and 21 are clamped together by common bolt and nut devices 24. The outer edge of the floor 20 has an outwardly sloping flange 25 enclosing the outer flange 14 of the U-shaped member 12. The flange 25 is turned under as at 26 to provide a finished appearance. The floor 20 further has a circular opening 27 co-incident with the opening 17, and it will be seen in Figure 2 that the plane of the floor slopes from the outer edge thereof upwardly towards the opening 27 at which is provided a vertical flange 28 resting on the sub-platform. The floor is secured to the sub-platform by screws 29 as shown more clearly in Figures 1 and 2.

The load of the vehicle consists of a tank or drum 30 passed through the circular openings 17 and 27 and resting on the chassis 8. The chassis takes the greater part of the load and is therefore formed with reinforcing ribs 31 at the angle between the neck 7 and the body thereof. The sloping floor 20, in addition to providing a neat and finished appearance to the truck, acts as a shed for fluid that may be spilled from the tank in transit. The horizontal portion of the chassis is provided with clips 32 in alignment with the edge of the openings and adapted to engage the bottom flange of the vessel 30 in the manner described in my co-pending application.

Reverting now to the front end construction shown in detail in Figure 4, it will be seen that the sleeve 5 and bracket 6 are rigid parts of the body of the truck, while the steering leg 1 and extension 3 thereof are rotatable with respect to the body. The upper end of the extension 3 is threaded at 33 and receives successively in superposed relation a bearing cap 34, the horizontal leg of a right angular bracket 35, and a nut 36 which clamps this leg against the cap. Roller bearings 37 are provided between the sleeve 5 and extension 3 at the lower ends thereof, and similarly between the upper end of the sleeve 5 and the cap 34.

The tubular extension 5 receives a vertically slidable stem 38 at the lower end of which is a brake shoe 39 adapted to engage the steering wheel 2. At the upper end is a head 40 adapted to protrude slightly beyond the nut 36 and normally raised to this position by a surrounding spring 41.

The forward end of the bracket 35 has an integral ear 42 to which is pivotally connected a plate 43 lying over the brake assembly and adapted to engage the head 40. This plate is formed with a hook 44 engaged by a spring 45 secured to the vertical leg of the plate 43. The relation between the spring and plate is such that the latter is normally moved against the head 40 whereby to push the brake into active position. A draft handle 46 is threaded into the plate near the pivot thereof. When the truck is pulled by the handle, the plate 43 is lifted from the head 40 against the action of the spring 45, and the truck may be freely drawn. When the operator ceases to pull the handle, the inertia of the truck will cause the body and associated parts to continue in their forward movement, which is equivalent to a rearward push on the handle 46. The plate 43 will then depress the stem 38 and apply the brake shoe 39 to the front wheel 2, whereby the truck will be stopped. It will be apparent that this action also occurs when the operator merely stops pulling on the handle, when he is taking the truck down an incline, when he deliberately moves the handle backwards with the intention of stopping the truck, or under any circumstances in which the fixed body of the truck advances relatively to the handle.

At the rear horizontal edge of the bracket 35 is formed an ear 47 to which is pivoted a cam 48 having a rear operating arm 49 and a forwardly extending finger 50 adapted to engage the lower surface of the horizontal leg of the bracket. When the cam member is in this position, the various parts associated with the brake mechanism operate in the manner described. When it is desired to eliminate the automatic action of the brake, the handle 49 is pulled upwardly whereby the cam 48 tilts the plate 43 upwardly and holds it spaced from the head 40. In this position, the brake will not function by opposite relative movements of the truck body and handle.

The construction shown in Fig. 5 is to be used when the operating or control member is not necessarily associated with the pulling handle. The spring pressed stem 51 is formed with a pointed head 52 and lies within a cap 53 threaded on the extension member 3'. The operating lever 54 is formed at its lower end with a ball 55 rotatable in the cap 53, but not removable therefrom. The lowermost portion of the ball has a depression 56 adapted to receive the point 52 when the brake is in release position. When it is desired to apply the brake, the operating handle 54 is displaced from upright position either manually or by the foot of the operator, whereupon the ball 55 has a cam action on the pointed end 52 of the stem and lowers the stem to apply the brake shoe 57 to the wheel therebeneath. It will be recognized that this construction operates directly on the handle rather than through medium of a plate such as that shown in Fig. 4.

Figure 6:
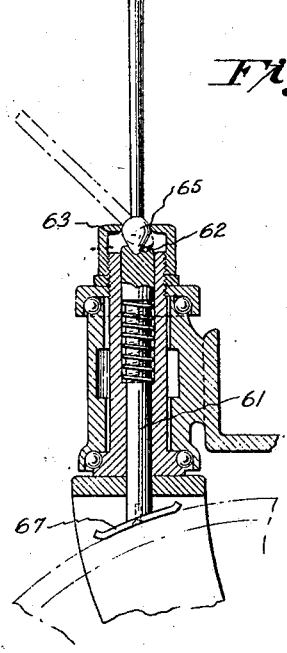
Figure 7:
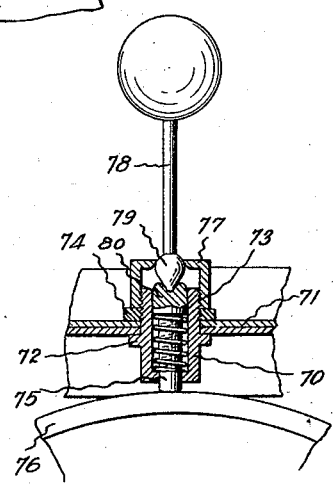

The device illustrated in Fig. 6 operates in like manner, but the operating handle 64 thereof is prolonged to function also as a drag or pulling handle. The upper end of the stem 61 is formed with a socket 62, and the cam member 65 movable in the cap 63 is in the shape of a pear having its point adapted for reception in the socket. When the vehicle is being pulled, the handle 64 assumes the dotted line position, and the stem 61 therefore takes an elevated position. When it is desired to apply the brake, the handle 64 is returned to vertical position, whereby the stem 61 is depressed and the shoe 67 carried thereby engages the wheel.

In Fig. 8 is illustrated a modified construction adapted for application to the rear wheels. A sleeve 70 is passed through the double marginal flange 71 of the floor and is formed with a collar 72 engaging the lower surface of this flange. The sleeve is threaded exteriorly as at 73 above the flange and receives a lock nut 74 co-operating with the collar to fix the sleeve to the flange. In the sleeve is slidably mounted a spring pressed braking stem 75 adapted to engage the wheel 76 therebeneath. A cap 77 is screwed on the upper end of the sleeve and receives the lower end of the operating handle 78 in substantially the manner illustrated in Fig. 6. This lower end is in the shape of a pear 79 having its point adapted for reception in a socket 80 formed in the upper end of the stem. The stem is actuated in the manner described in connection with Fig. 6, and the handle 78 may be moved sharply and quickly by a push with the hand or foot.

Although specific embodiments of the invention have been illustrated and described, it will be understood that various alterations in the details of construction may be made without departing from the scope of the invention as indicated by the appended claims.

What I claim is:

1. In a truck, a wheeled body, a leg pivotally supported by said body, a steering wheel carried by said leg, a stem slidably mounted in said leg, a brake shoe carried by said stem and adapted to engage said wheel, a member fixed to said leg and rotatable therewith, and a handle having an extension operative in said member and adapted to engage said stem.

2. In a truck, a wheeled body, a sleeve supported by said body, a stem slidably mounted in said sleeve and adapted to engage said wheel, a member fixed to said sleeve, and a handle having an extension operative in said member and adapted to engage said stem, and a spring carried by said sleeve and normally depressing said extension upon said stem.

3. In a truck, a wheeled body, a leg pivotally supported by said body, a steering wheel carried by said leg, a stem slidably mounted in said leg, a brake shoe carried by said stem and adapted to engage said wheel, a bracket fixed to said leg and rotatable therewith, and a handle pivoted to said bracket and having an extension adapted to engage said stem.

4. In a truck, a wheeled body, a leg pivotally supported by said body, a steering wheel carried by said leg, a stem slidably mounted in said leg, a brake shoe carried by said stem and adapted to engage said wheel, a bracket fixed to said leg and rotatable therewith, a handle pivoted to said bracket and having an extension adapted to engage said stem, and a spring carried by said bracket and normally depressing said extension upon said stem.

In testimony whereof, I affix my signature.

JOHN W. COATES.